UNITED STATES PATENT OFFICE.

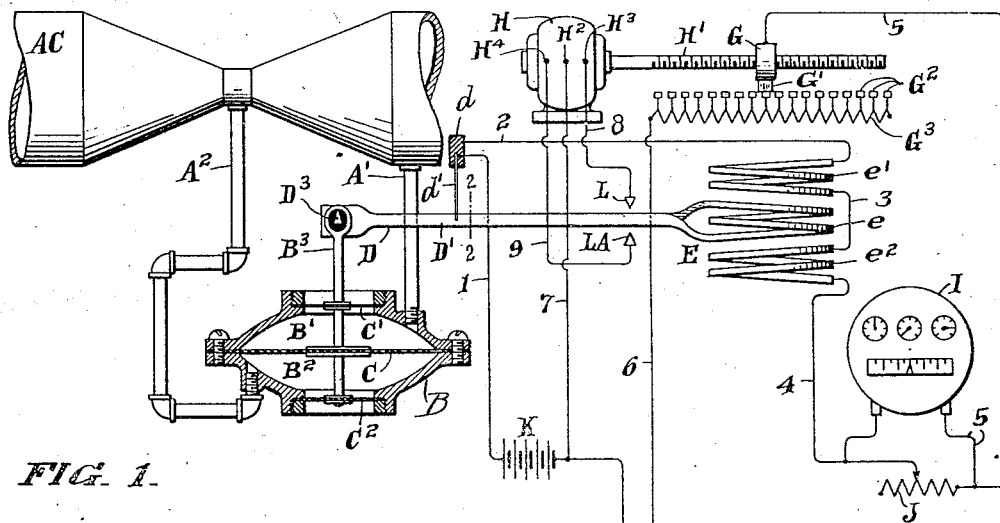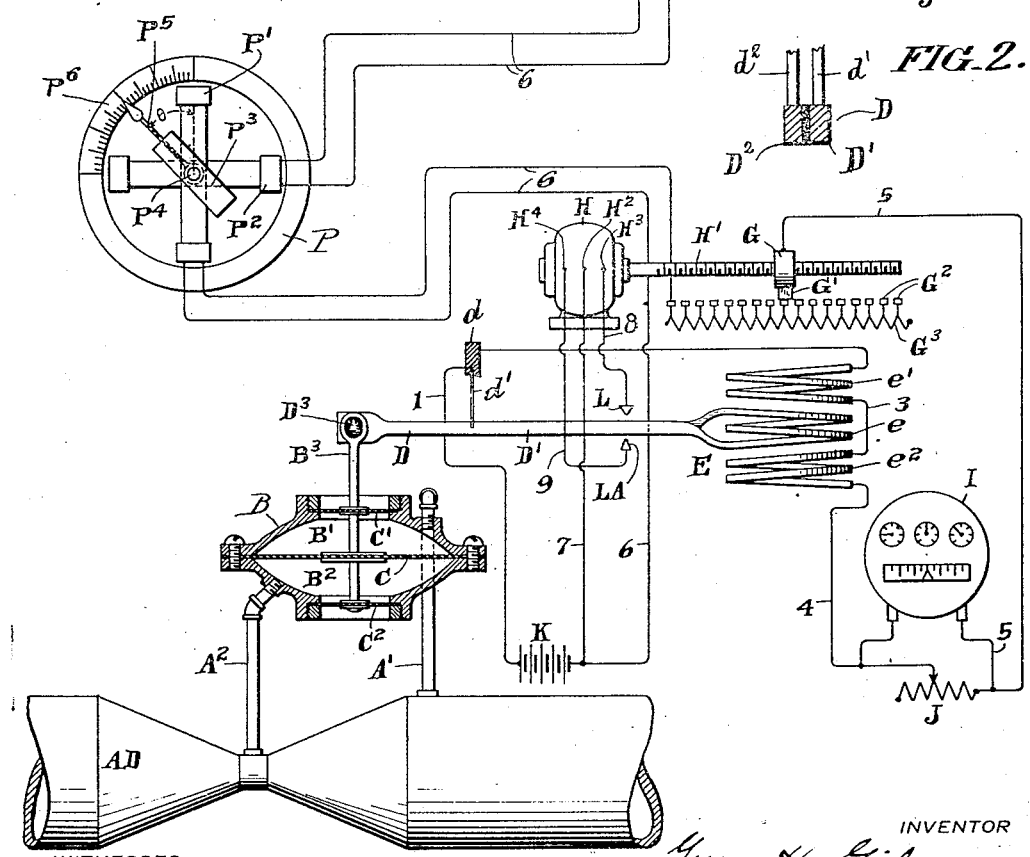

GEORGE H. GIBSON, OF MONTCLAIR, NEW JERSEY.

MEASURING APPARATUS.

1,162,475.  Specification of Letters Patent.  Patented Nov. 30, 1915.

Application filed September 26, 1913. Serial No. 791,923.

*To all whom it may concern:*

Be it known that I, GEORGE H. GIBSON, a citizen of the United States of America, residing in Montclair, in the county of Essex and State of New Jersey, have invented certain new and useful Improvements in Measuring Apparatus, of which the following is a true and exact description, reference being had to the accompanying drawings, which form a part thereof.

My present invention relates to measuring apparatus, and has for its object to provide simple and effective apparatus for measuring the ratio between two separately variable non-electrical forces or quantities.

In the preferred mode of carrying out my invention, I provide simple and effective means for balancing each of the two variable non-electrical forces to be compared, by electromagnetic means, comprising an electro-magnetic balancing device proper for each of said forces and means for supplying an energizing current to each device automatically varied in intensity as required to maintain the balance. The strength of each of the two balancing electric currents flowing, one through each electro-magnetic balancing device, is thus a measure of the corresponding non-electrical force balanced, and I obtain the desired measure of the ratio between the two non-electrical forces or quantities to be compared by measuring the differential of the two electrical currents by the aid of a suitable instrument.

A measure of the electric current differential may be had by means of a simple, reliable and relatively inexpensive instrument, and a further advantage of my invention lies in the fact that I may separately indicate, integrate or record the variations of each of the non-electrical forces or quantities compared, by means of an ordinary commercial form of indicating, recording or integrating ammeter, through which the corresponding electric current producing the balancing force is passed.

My invention is of especial utility in and was especially devised for obtaining a ratio of the quantities of fluid flowing through two conduits. For this purpose I prefer to employ an electro-magnetic balancing device in which the balancing force exerted is proportional to the square of the energizing current, to balance each pressure differential or velocity head forming a measure of the rate of flow of a fluid through the corresponding conduit. With such an arrangement the rate of fluid flow through each conduit is itself proportional to the square root of the pressure differential balanced by the corresponding electro-magnetic device. Hence the fluid flow through each conduit is in linear proportion to the strength of the electrical current passing through the corresponding electro-magnetic balancing device. This simplifies the operation of comparing the two flows and does away with any necessity for cam or other rectifying provisions generally required with flow measuring apparatus of this general character in order to obtain proportional indications of the individual rates of fluid flow, or to directly integrate, or to obtain a record thereof which may be readily integrated.

The various features of novelty characterizing my invention are pointed out with particularity in the claim annexed to and forming a part of this specification. For a better understanding of the invention, however, and of the advantages possessed by it, reference should be had to the accompanying drawings and descriptive matter in which I have illustrated and described one form in which my invention may be embodied.

Of the drawings: Figure 1 is a diagrammatic representation of apparatus for separately measuring the flow through each of two conduits, and for obtaining a direct measure of the ratio of the flow through one conduit to the flow through the other conduit; and Fig. 2 is a section taken on the line 2—2 of Fig. 1.

In the apparatus diagrammatically illustrated in Fig. 1, AC represents the Venturi tube section of a conduit through which one of the gases or liquids to be measured and compared flows, and AD represents the Venturi tube section through which the other fluid flows; for instance, the conduit AC may be the steam pipe leading away from a steam generating boiler, and AD the conduit through which air or liquid fuel is supplied to the boiler furnace.

Associated with the two Venturi tube sections are two sets of instrumentalities. As these are duplicates, a description of the set pertaining to the section AC will suffice for both sets. A' and A² represent pipe connections leading from high and low pressure zones, respectively, of the Venturi tube section AC to the chambers B' and B² of a differential pressure device B. As shown, the chambers B' and B² are separated by a flexible diaphragm C. This diaphragm is connected at its center to a stem B³ which is also connected to flexible diaphragms C' and C². The latter close apertures in the walls of the chambers B' and B² remote from the diaphragm C, and make stuffing box provisions for the stem B³ unnecessary.

The stem B³ is pivotally connected at its upper end to a lever D, to the opposite end of which is secured the movable coil $e$ of the electro-magnetic balancing device E. As shown, the lever D is formed by two metal bars D' and D² insulated from each other; and forming the terminals of the coil $e$. The lever D is suspended from a fixed support $d$ by flexible conductors $d'$ and $d^2$ connected at their lower ends to the bars D' and D², respectively. The knife-edge pivot D³ carried by the lever D and the stem B³ engaging the pivot D³ are insulated from the bars D' and D². The electro-magnetic balancing device E also comprises stationary coils $e'$ and $e^2$ coaxial with and located one above and the other below the coil $e$. When an electric current is caused to flow in series through the coils $e$, $e'$ and $e^2$ by the circuit connections hereinafter referred to the coil $e$ is attracted by the coil $e^2$ and repelled by the coil $e'$.

The means employed for adjusting the electric current flow through the coils $e$, $e'$ and $e^2$ to impress the required variable balancing force on the lever D, comprises a rheostat G, a reversible electric motor H, and controlling provisions for operating the latter in one direction or the other in response to the movements of the lever D out of a neutral position. The rheostat G, as somewhat conventionally illustrated, comprises a contact member G' movable along and engaging one or another of the stationary contacts G² connected at intervals to a resistance conductor G³. As shown, the member G' has a threaded passage receiving the threaded shaft H' of the motor H. The motor H in the arrangement illustrated, runs in one direction when a suitable source of electric current is connected to its terminals H² and H³, and in the opposite direction when current is supplied to the motor terminals H² and H⁴.

K represents an electric battery or other suitable source of electric current for the balancing device E and for the motor H. The electric current flowing through the coils of the device E is measured by an ammeter I, which may be of any suitable or usual form, adapted to indicate, make a record of, or integrate the flow of current therethrough, or perform any two, or preferably perform all three of these functions.

J represents a rheostat connected in shunt to the ammeter I by which the constant of the latter may be adjusted.

One terminal of the battery K is connected by the conductor 1 to the flexible support $d'$ for the lever D and thereby to the bar D' forming one terminal of the floating coil $e$. The bar D² forming the other terminal of the coil $e$ is connected through the flexible conductor $d^2$ and the conductor 2 to one terminal of the stationary coil $e'$. The other terminal of the stationary coil $e'$ is nected by a conductor 3 to one terminal of the coil $e^2$. The other terminal of the coil $e^2$ is connected by a conductor 4 to one terminal of the ammeter I. The second terminal of the ammeter I is connected by the flexible conductor 5 to the movable element G' of the rheostat G. The resistance conductor G³ of the rheostat G is connected at one end to the second terminal of the source of current K by the conductor 6. Connected in series with the conductor 6 is the coil P² of the flow comparing instrument P proper. The coil P' of the instrument P is connected in series with the conductor 6 pertaining to the conduit AD. The common terminal H² of the motor H is connected by the conductor 7 to the opposite side of the source of current K from that which is connected to the bar D' of lever D. The other two terminals H³ and H⁴ of the motor H are connected by conductors 8 and 9 to stationary contacts L and LA, respectively, mounted above and below the lever D and engaged by the bar D' of the latter on a slight movement of the lever up or down from a neutral position.

When the downward pull of the device E on the lever D is insufficient to balance the pull on the other end of the lever exerted by the differential pressure device B, the lever D moves from its normal neutral position into contact with the stationary contact L, and thus closes the current supply circuit for the motor H comprising the source of current K, conductor 1, bar D' of lever D, contact L, conductor 8, terminals H³ and H² and conductor 7, leading back to the source of current K. This causes the motor H to rotate in the direction to move the movable element G' of the rheostat G to the left, as seen in Fig. 1, and thereby reduce the amount of resistance offered by the rheostat to the flow of current through the circuit including the coils $e$, $e'$ and $e^2$. This increases the flow of current through the coils and consequently increases the pull of the device E, until the lever D returns to its neutral position. When, on the other hand, the downward pull exerted by the balancing device E is greater than is required, the consequent movement of the lever D out of its neutral position into engagement with the stationary contact LA will close the energizing circuit of the motor H including the source of current K, conductor 1, bar $D'$ of lever D, contact LA, conductor 9, motor terminals $H^4$ and $H^2$ and conductor 8. This causes the motor H to rotate in the direction to move the element $G'$ of the rheostat G to the right and thereby increase the resistance in circuit with, and reduce the current flowing through the coils $e$, $e'$ and $e^2$, until the lever D is returned to its normal neutral position.

Inasmuch as the differential of the pressures exerted on the stem $B^3$ of each differential pressure device B, through its diaphragms C, $C'$ and $C^2$, is proportional to the square of the fluid rate of flow through the corresponding Venturi tube section, while the balancing force exerted by the corresponding electro-magnetic balancing device E is proportional to the square of the electric current flowing through the coils of the latter, the intensity of the electric current passing through the corresponding conductor 6 and indicated, integrated and recorded by the ammeter I will be in linear proportion to the rate of fluid flow through the conduit of which the corresponding Venturi tube section forms a part.

The electrical instrument P employed to obtain a direct measure of the ratio between the volumes of flow through the conduits AC and AD comprises in addition to the two coils $P'$ and $P^2$ arranged at right angles to one another, an armature $P^3$ mounted on a spindle $P^4$ which is diametrally disposed with reference to each of the coils $P'$ and $P^2$ and carries an indicating arm $P^5$ sweeping over a quadrant scale $P^6$. The currents passing through the coils $P'$ and $P^2$ and the magnetic forces exerted by these coils will be proportional to the volumes of flow through the conduits AC and AD, respectively. The torque exerted by each coil on the armature $P^3$ tending to set the latter at right angles to the plane of the coil will be proportional to the product of the magnetic force of the coil multiplied by the cosine of the angle of inclination of the armature to the plane of the coil. Inasmuch as the armature $P^3$ will occupy the position at any instant at which the torque exerted on it by one coil balances the torque exerted by the other coil, it follows, therefore, that if $a$ equals the rate of flow through the conduit AC, and $b$ equals the rate of flow through the conduit AD, and $\theta$ equals the angle of inclination of the armature $P^3$ to the coil $P'$, for instance; then $$a \text{ cosine } \theta = b \text{ cosine } (90° - \theta)$$

or $$\frac{a}{b} = \frac{\text{cosine } 90° - \theta}{\text{cosine } \theta}$$

Since cosine $(90° - \theta) =$ sine of $\theta$, the ratio of the two rates of flow; i. e., $\frac{a}{b}$, will thus be equal to the tangent of the angle $\theta$.

It will be apparent of course that with the apparatus described the indications obtained do not depend upon the constancy of the voltage of the source of current K and are unaffected by changes in the constants, so to speak, of the rheostats G and J, such as might result from dirty contacts, and that the only parts of the electrical apparatus which need to be carefully constructed and adjusted are the electro-magnetic balancing devices E, ammeters I and the instrument P.

Each device E and lever D are essentially the same in construction and mode of operation as parts of the well known Kelvin current balance, and the construction and adjustment of this portion of the apparatus to give the desired reliability and accuracy is a relatively simple matter.

The instrument P is simple in form, and may readily be made reliable and highly accurate in operation. Each ammeter I may obviously be any one of numerous highly satisfactory and efficient types in commercial use at the present time.

A characteristic advantage of the apparatus described arises from the fact that the only movements of the diaphragms $C'$, $C^2$ and C and of the coils $e$ relative to the coils $e'$ and $e^2$ required are those necessary to accommodate the limited movement of the lever D between the contacts L and LA. In practice these movements may be so small that they do not appreciably affect the inductive relation of either coil $e$ with the corresponding coils $e'$ and $e^2$, or the flexibility of the diaphragms.

While in accordance with the provisions of the statutes I have illustrated and described the best form of my invention now known to me, it will be apparent to those skilled in the art that changes may be made in the form of apparatus disclosed without departing from the spirit of my invention, and that in some cases certain features of my invention may advantageously be used without a corresponding use of other features.

Having now described my invention, what I claim as new and desire to secure by Letters Patent, is:

Apparatus for comparing the rates of flow through two conduits comprising an instrument consisting of two non-parallel coils having intersecting axes, and a pivoted armature element magnetically actuated by each coil and means automatically responsive to the velocity head at some point in each conduit for causing an electric current proportional to the flow through said conduit to pass through a corresponding coil.

GEORGE H. GIBSON.

Witnesses:
PAUL C. BAUCEL,
STANLEY D. BROWN.